June 23, 1953  G. F. BOURNE ET AL  2,643,073
REEL

Filed Feb. 4, 1950  2 Sheets-Sheet 1

INVENTORS
GORDON F. BOURNE
& WILLIAM E. KENNEDY
BY
ATTORNEY

INVENTORS
GORDON F. BOURNE
& WILLIAM E. KENNEDY
BY
ATTORNEY

Patented June 23, 1953

2,643,073

UNITED STATES PATENT OFFICE 2,643,073

REEL

Gordon F. Bourne, Oakland, and William E. Kennedy, Hayward, Calif.; said Bourne assignor, by direct and mesne assignments, of one-third to Frank P. Adams and one-third to Robert H. Eckhoff, both of Piedmont, Calif.

Application February 4, 1950, Serial No. 142,383

1 Claim. (Cl. 242—84.5)

This invention relates to an improved fishing reel and particularly to the drag mechanism utilized on such a reel.

During the playing of a fish, varying degrees of tension are placed on the fish line, depending on the size and motion of the fish and the positive pressure exerted by the operator of the fishing reel. To assist in playing a fish, drag mechanisms have been utilized to place a predetermined tension on the line and which the fish must exceed before gaining line from the reel; these usually consist of a friction clutch interposed in the drive between the crank handle employed to turn the spool and the spool. A ratchet device is usually employed to the end that the handle can only turn in one direction so that drag provided by the friction clutch in effect makes it a brake working against the pull of the line on the reel. The tension on the clutch is adjusted by a wheel or knob on the reel which is independent of the reel handle; the clutch, being interposed in the train utilized to rotate the spool, is, in effect, a friction brake which can be adjusted to slip when the applied force from the line exceeds that force engaging the clutch elements. To vary the drag on the line, it is necessary for the fisherman to have a hand free to turn the wheel or knob. This is all too frequently an impossibility.

In accordance with this invention, the control for the brake or friction clutch is provided in cooperative association with the reel operating handle, the two being so related that the fisherman can control the degree of applied friction and rotation of the spool to release line with one hand at all times and without doing more than varying the pressure applied by the hand holding the reel handle. This enables the line to be subject to an instantaneous high tension to jerk the fish and so tire it, a feature of advantage in deep-sea fishing.

It is a broad object of the present invention to provide an improved fishing reel having a drag mechanism which can be manipulated as desired by a fisherman utilizing simultaneously the hand employed to rotate the reel spool.

The invention includes other objects and features of advantage, some of which, together with the foregoing, will appear hereinafter wherein the present preferred form of mechanism embodying the present invention is disclosed.

Figure 1:
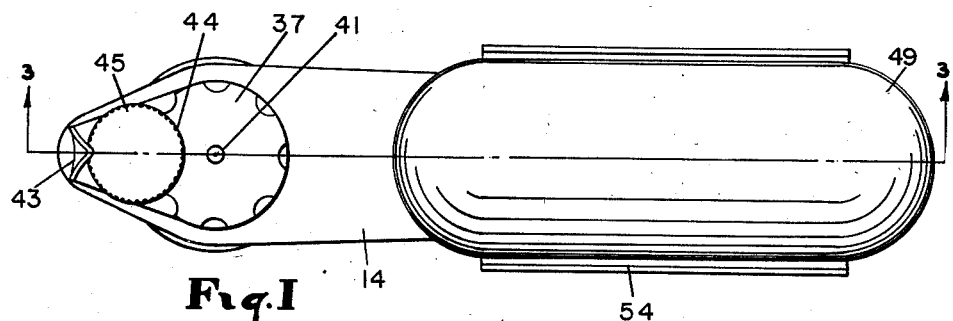
Figure 1 represents a plan view of the reel crank handle and arm from which, for convenience, the reel has been omitted.
Figure 2:
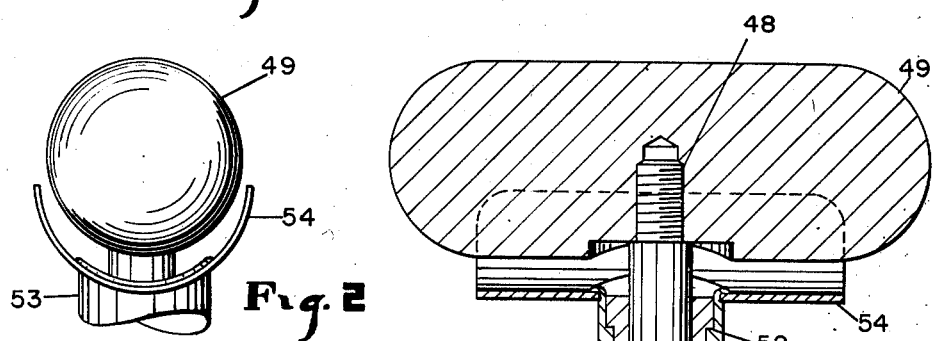
Figure 2 is an end view of the handle grip.

As is shown in the drawings, a conventional reel is employed having side plates 3 and 4 secured together by cross-members 2 and providing a support for reel spool 6; a base plate 1 is provided for mounting the reel on a rod in the well-known manner. Cover 7 encloses certain of the driving mechanism, as will presently appear.

Figures 3, 4:
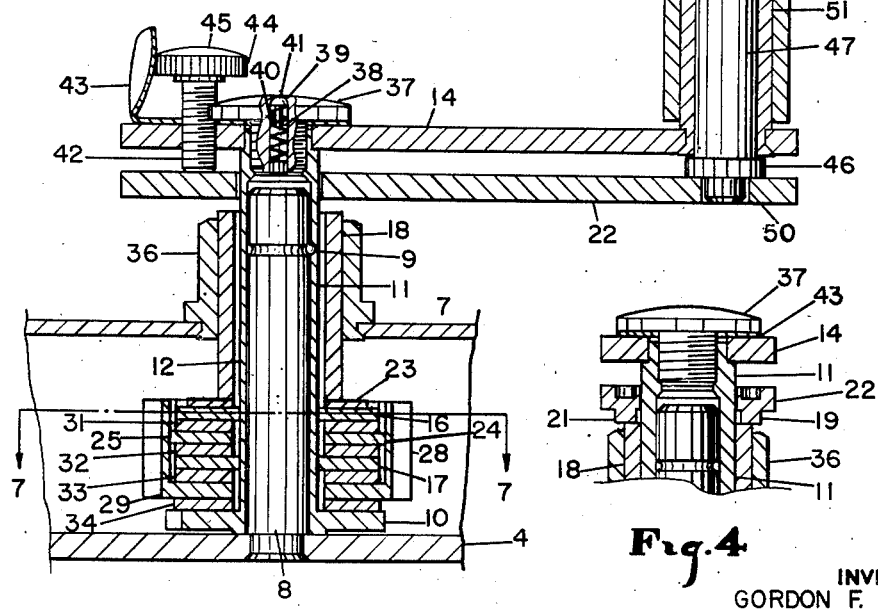
Figure 3 is a cross section of the fishing reel drag handle mechanism taken along the line 3—3 in Figure 1.
Figure 4 is a fragmentary section through the handle securing means.

Referring particularly to Figure 3, a support post 8 is crimped perpendicularly into the side plate 4. Mounted to rotate about the longitudinal axis of the support post 8 and secured against sliding on the support post by a key 9 is a sleeve 11 having a ratchet wheel 10 cooperating with a dog (not shown) to permit the spool to be rotated by the fisherman in only one direction. The ratchet wheel and dog construction are well-known in the art and will not be described further. Sleeve 11 extends above the cover plate 7 and carries a handle 14 secured thereto by a screw 37. The sleeve provides the driving side of a friction clutch mechanism mounted within a gear 28 which is in the gear train provided in the reel between the handle and the reel spool. The clutch includes spaced metallic discs 16 and 17 engaged with flats 12 on the sleeve 11, metallic discs 24 having ears 25 thereon fitting in suitable grooves in the gear 28, a metallic lower annular portion 29 of the gear 28 and friction discs 31, 32, 33 and 34 of a friction resistant material, interposed between the several metal discs 16, 17, 24, 29 and ratchet wheel 10. The clutch includes a pressure plate 23 engaged with a clutch operating sleeve 18 slidable on the sleeve 11. The clutch described is conventional and the number and size of the friction discs and clutch elements can be varied to suit the reel described.

To turn the sleeve 11, the handle 14 is fitted onto the sleeve end and is secured by the screw 37; a lubricant passage 38 to the interior of the clutch is provided in the screw 37, being sealed by a ball 41 and a spring 40.

To operate the clutch, the clutch operating sleeve 18 is slidable on the sleeve 11 and within a tubular post 36 secured on cover plate 7. A lever arm 22 is mounted parallel to the crank 14, having an aperture to pass the sleeve 11, the lever arm 22 having ears 19 and 21 bearing on the clutch operating sleeve 18. The fixed compression placed on the clutch by the lever arm 22 is adjusted by a screw 42, this being locked in any desired position by an ear portion of member 43 engaging the knurled side 44 on the screw head 45; the screw 42 is effective to move the adjacent ends of the lever 22 and the crank arm 14 apart as desired.

The crank arm 14 includes a support sleeve 51 secured thereto and having an outer finger grip 54 supported thereon by an outer sleeve 53. Slidable and rotatable in the sleeve 51 is a post 47 having a handle 49 mounted at the threaded end 48 thereof and a collar 46 adjacent its other end which end projects into an aperture 50 in the end of lever 22. The upper end of the support sleeve 51 includes a shoulder 52 to restrict sliding between sleeve 53 and the support sleeve 51 and yet permit the grip 54 and handle 49 to rotate freely as the crank arm is turned.

Figure 5:
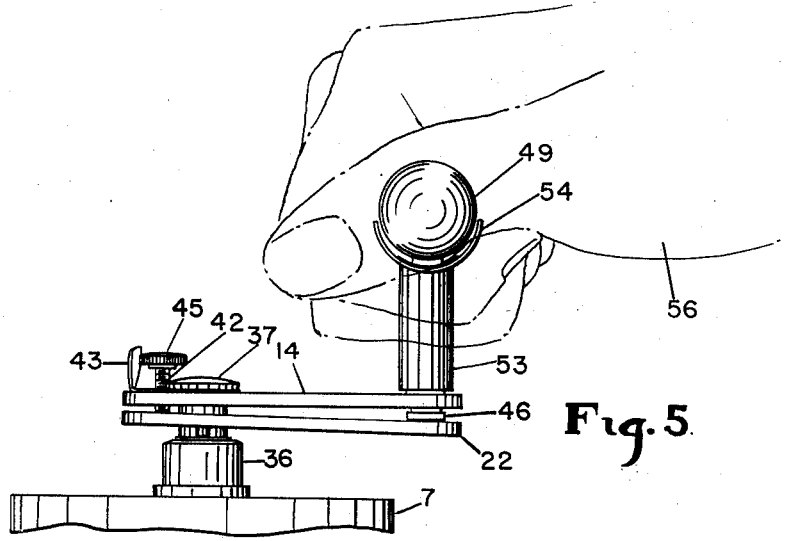
Figure 5 is a side view illustrating operation of the drag handle mechanism.
Figure 6:
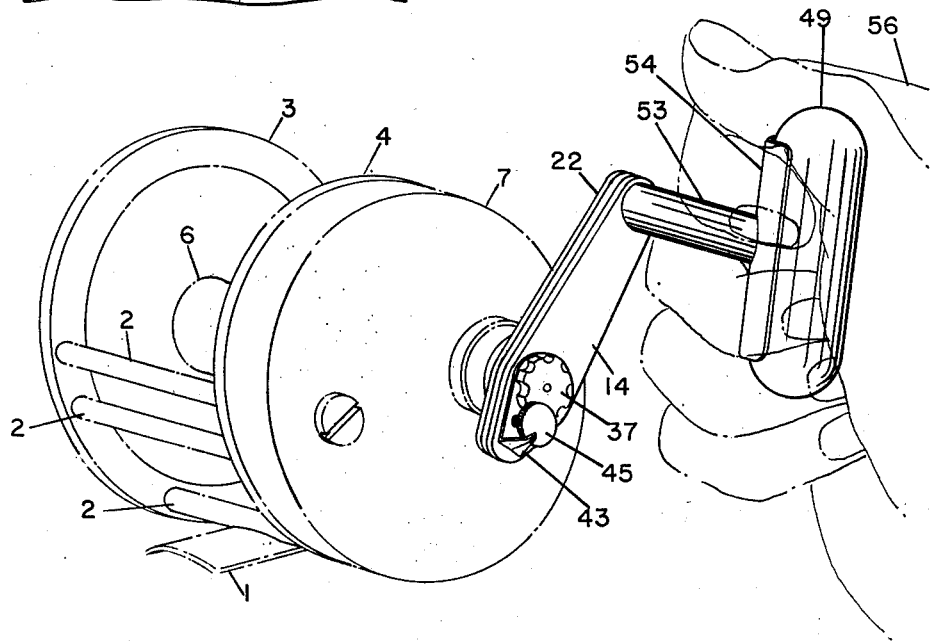
Figure 6 is a perspective view of the fishing reel drag handle mechanism, showing manipulation by an operator.
Figure 7:
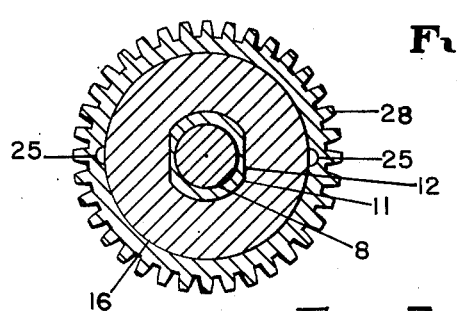
Figure 7 is a section along the line 7—7 in Figure 6.

In operation, under conditions when a fish is placing tension on the line issuing from the reel, the operator's reel cranking hand 56 is utilized to rotate the crank handle to retrieve the line or to control the drag on the line, or both. For example, when the hand holding handle 49 and grip 54 is squeezed to move the handle knob 49 and the hand grip 54 toward one another, pressure is exerted to move the lever 22 against the fulcrum provided by screw 42 and the control sleeve 18 to increase the degree of engagement of the clutch mechanism. The extent of this downward pressure depends upon the pressure applied on squeezing the knob and the grip and the particular lever system used to operate the clutch; this movement will be apparent upon comparing the released position of lever 22 in Figure 3 and its pressure application position in Figure 5.

Downward lateral pressure on the clutch control sleeve 18 is transmitted through the clutch mechanism, thereby increasing the frictional drag between the metallic annular members 16 and 17 keyed to the sleeve 11 and the metallic annular members 24 and 29 keyed or secured to the gear 28 and the interposed friction disc members 31, 32, 33 and 34. As the gear in the clutch is enmeshed with a gear (not shown) in the train rotating the fishing reel spool 6, the drag on the rotation of the spool can be controlled by the mere flexing of the hand 56 operating the fishing reel crank handle. The spool 6 can be rotated by the crank handle to retrieve the line only when the pressure transmitted through the clutch mechanism exceeds the tension placed on the line by the fish. If the pressure through the clutch mechanism is not sufficient to overcome the pull of the fish, the spool 6 will play line out whether or not the operator may be turning the crank in attempting to retrieve the line. The line tension can never exceed the pressure transmitted through the clutch by the operator's flexed hand 56; thus, an effective, easy and rapid line tension control is possible with the structure embodying the present invention.

From the foregoing, it is believed to be apparent the present invention presents a new and useful structure in the art of fishing reels for it offers a structure which is capable of rapidly and easily controlling the fishing line tension.

We claim:

A fishing reel having a spool, a crank arm for rotating said spool, a friction clutch mechanism interposed between the spool and the crank arm and operable selectively to apply a desired degree of crank movement to the spool, a lever extending parallel to said crank and engaged near one end with said friction clutch mechanism to operate said friction clutch mechanism selectively to apply a desired degree of crank movement to said spool and control rotation of the spool, a fulcrum point at one end of the lever, adjacent the point of contact with the clutch mechanism, said fulcrum comprising an adjustable screw threadably mounted in the crank arm, the end of said screw being in contact with the lever and serving to provide a fulcrum which can be displaced laterally upon turning the screw, a semi-cylindrical finger grip member rotatably mounted on an end of said crank intermediate the ends of said member, and a handle secured rotatably on the other end of said lever with the underside of said handle fitting cooperatively within the confines of said semi-cylindrical finger grip member and being rotatable with said member and being movable toward and away from said finger grip member to move said lever selectively with respect to the crank arm.

GORDON F. BOURNE.
WILLIAM E. KENNEDY.

References Cited in the file of this patent

UNITED STATES PATENTS

| Number | Name | Date |
|---|---|---|
| 804,047 | Rockwell | Nov. 7, 1905 |
| 1,932,360 | Adams | Oct. 24, 1933 |
| 2,184,149 | Marr | Dec. 19, 1939 |
| 2,298,481 | Hayes | Oct. 13, 1942 |
| 2,363,533 | King | Nov. 28, 1944 |
| 2,502,814 | Bater | Apr. 4, 1950 |
| 2,518,902 | King | Aug. 15, 1950 |